(12) United States Patent
Nakano

(10) Patent No.: US 8,042,883 B2
(45) Date of Patent: Oct. 25, 2011

(54) BRAKING DEVICE FOR VEHICLE

(75) Inventor: Masaki Nakano, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1305 days.

(21) Appl. No.: 10/581,454

(22) PCT Filed: Nov. 29, 2004

(86) PCT No.: PCT/JP2004/017679
§ 371 (c)(1), (2), (4) Date: Jun. 1, 2006

(87) PCT Pub. No.: WO2005/054025
PCT Pub. Date: Jun. 16, 2005

(65) Prior Publication Data
US 2007/0247001 A1    Oct. 25, 2007

(30) Foreign Application Priority Data
Dec. 1, 2003  (JP) .................................. 2003-402172

(51) Int. Cl.
*B60T 8/42* (2006.01)
(52) U.S. Cl. .................. 303/115.1; 303/112; 303/151; 188/106 A; 188/106 F
(58) Field of Classification Search .................. 303/152, 303/155, 112, 151, 115.1; 188/160 A, 106 F, 188/106 P, 134, 181 T, 182; 180/264, 65.51
See application file for complete search history.

(56) References Cited

U.S. PATENT DOCUMENTS

| 4,475,774 | A | | 10/1984 | Davis |
| 5,222,568 | A | * | 6/1993 | Higasa et al. ............... 180/65.51 |
| 5,539,641 | A | * | 7/1996 | Littlejohn ........................ 701/70 |
| 5,588,721 | A | * | 12/1996 | Asano et al. ................... 303/163 |
| 5,615,933 | A | * | 4/1997 | Kidston et al. ................ 303/152 |
| 5,632,534 | A | * | 5/1997 | Knechtges ..................... 303/152 |
| 6,113,119 | A | * | 9/2000 | Laurent et al. ............. 280/124.1 |
| 6,120,115 | A | * | 9/2000 | Manabe ........................ 303/152 |
| 6,275,763 | B1 | * | 8/2001 | Lotito et al. ..................... 701/71 |
| 6,386,553 | B2 | * | 5/2002 | Zetterstrom ................. 280/5.51 |
| 6,439,674 | B1 | * | 8/2002 | Niino ............................ 303/152 |
| 6,607,253 | B1 | * | 8/2003 | Yamamoto et al. ........... 303/112 |
| 6,959,971 | B2 | * | 11/2005 | Tsunehara .................... 303/152 |
| 2004/0090116 | A1 | * | 5/2004 | Tsunehara .................... 303/152 |

FOREIGN PATENT DOCUMENTS

| DE | 3010489 A1 | 9/1981 |
| DE | 3627702 A1 | 2/1987 |
| DE | 4327206 A1 | 2/1995 |
| JP | 1-212655 A | 8/1989 |
| JP | 2000-74102 A | 3/2000 |
| JP | 2001-071880 A | 3/2001 |

* cited by examiner

*Primary Examiner* — Bradley King
*Assistant Examiner* — Thomas Irvin
(74) *Attorney, Agent, or Firm* — Foley & Lardner LLP

(57) ABSTRACT

To provide a brake device for a motor vehicle that can suppress variation in braking force applied to a wheel regardless of variation in friction coefficient between a rotator and a braking means in a fluid pressure brake.

A brake device for a motor vehicle is provided with a fluid pressure brake 2 (braking means) that applies brake force according to brake fluid pressure to a brake disk (rotator) 20 fixed to a driving wheel (wheel) 3, and has a first feedback mechanism (pressure-reducing means) 15-1 that applies reaction force inputted from the brake disk 20 to the fluid pressure brake 2 in brake operation in a reducing direction of the brake fluid pressure.

15 Claims, 11 Drawing Sheets

FIG. 9
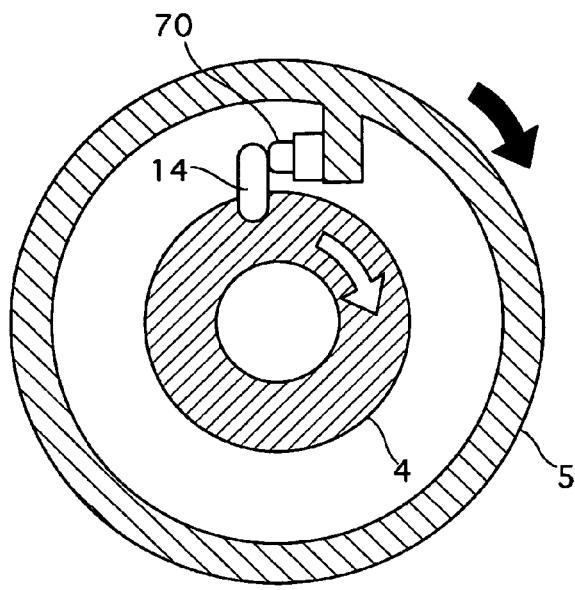
FIG. 10A
FIG. 10B
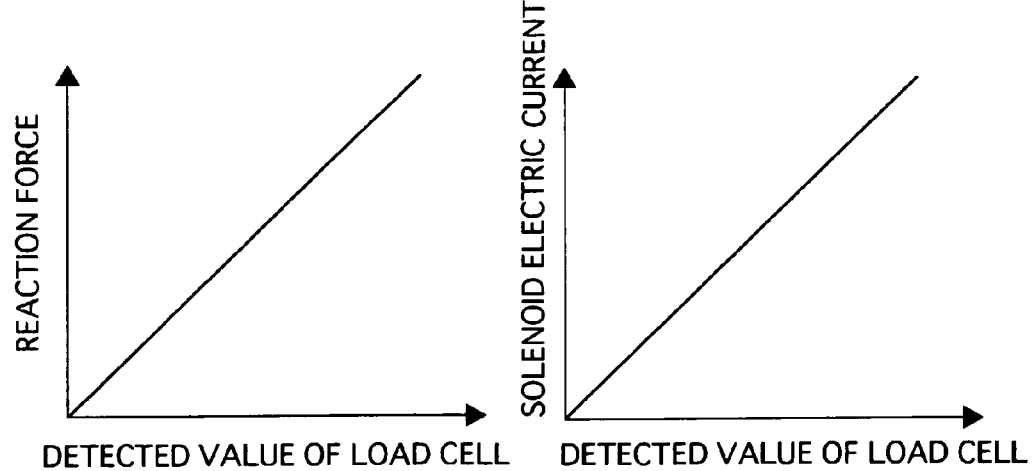

BRAKING DEVICE FOR VEHICLE

TECHNICAL FIELD

The present invention relates to a brake device adapted for a motor vehicle which can always apply constant brake force regardless of variation in friction coefficient in the brake device when brake torque generated by a fluid pressure brake is applied to driving wheels.

DESCRIPTION OF THE RELATED ART

In a conventional brake device in which driving wheels are applied by brake torque obtained from regenerative brake torque generated by a rotating electric machine and fluid pressure brake torque generated by a fluid pressure brake, an input/output ratio (a boost ratio) of a brake power booster is controlled to obtain on-demand brake torque corresponding to a brake pedal press force as follows (Refer to the patent reference 1). When regenerative brake can operate, target fluid pressure brake torque is set to be the sum of the minimum brake torque of the fluid pressure brake and distribution brake torque, where the minimum brake torque corresponds to brake pedal press force, and the distribution brake torque is calculated by a difference between actual regenerative brake torque and allocated brake torque obtained by subtracting the minimum brake torque from on-demand brake torque.

[PATENT REFERENCE 1] Japanese Patent Application Laid-open No. (Tokkai) 2001-71880

DESCRIPTION OF THE INVENTION

Problem(s) to be Solved by the Invention

In the conventional brake device, the regenerative brake torque is applied directly to the wheel as brake force, and the fluid pressure brake torque is applied by the fluid pressure brake as brake force generating friction torque between its brake disk and its brake pad in a disk brake for example. Accordingly, the brake force varies dependent on a variation in a friction coefficient between the brake disk and the brake pad even when the fluid pressure applied is constant. The variation in the friction coefficient causes in cases such that drops of water adhere on the brake disk during driving in the rain or the brake pad is worn away due to long-term use. The friction-coefficient variation generates in the brake force, which is obtained in a braking state of the fluid pressure brake and also in a cooperative braking state of the fluid pressure brake and the regenerative brake, thereby giving an uncomfortable feeling to a driver. This is a problem due to a mechanism that converts the fluid pressure into the friction torque, as described above.

The present invention is obtained allowing for the above-described problems, and its object is to provide a brake device, for a motor vehicle, that can suppress a variation in brake force applied to a wheel regardless of a variation in a friction coefficient between a rotator and a braking means in a fluid pressure brake.

In order to achieve the object, in this invention, there is provided a brake device provided with a braking means that applies brake torque according to brake fluid pressure to a rotator fixed to a wheel, the brake device includes a fluid pressure brake, a wheel-cylinder pressure passage, an on-demand brake pressure passage, and a brake reaction torque detecting means (or detector). The fluid pressure brake applies fluid pressure brake torque to a wheel. The wheel-cylinder pressure passage is fluidically connected with the fluid pressure brake to provide the fluid pressure brake with wheel-cylinder pressure to generate the fluid pressure brake torque. The on-demand brake pressure passage is fluidically connectable with the wheel-cylinder pressure passage to determine on-demand brake torque. The brake reaction torque detecting means detects brake reaction torque inputted to the fluid pressure brake. The wheel-cylinder pressure modulator valve is fluidically connected with the wheel-cylinder pressure passage and the on-demand brake pressure passage. The wheel cylinder pressure modulator valve is capable of modulating the wheel-cylinder pressure so that the fluid pressure brake torque can be decreased based on the brake reaction torque and the on-demand brake torque. The brake reaction torque detector includes a machine-side cylindrical case with a mechanical a working arm that is provided swingably relative to a vehicle body member so that the brake reaction torque of the fluid pressure brake can be changed into a displacement in a swing movement of the working arm so as to apply the brake reaction torque to a valve of the wheel-cylinder pressure modulator valve. The vehicle body member is formed with an on-demand brake fluid pressure chamber fluidically connected with the on-demand brake pressure passage, a wheel-cylinder fluid pressure chamber is fluidically connected with the wheel-cylinder fluid passage, and a return fluid pressure chamber is fluidically connected with a return passage. An orifice is provided in a first communicating fluid pressure passage between the on-demand brake fluid pressure chamber and the wheel-cylinder fluid pressure chamber. The wheel-cylinder pressure modulator valve is provided in a second communicating fluid pressure passage between the wheel-cylinder fluid pressure chamber and the return fluid pressure chamber. The wheel-cylinder pressure modulator valve has a mechanical feedback mechanism for modulating the wheel cylinder fluid pressure so that a sum torque of the brake reaction torque applied through the working arm in the opening direction and the fluid pressure brake torque due to the wheel cylinder fluid pressure in the opening direction can be balanced with the on-demand brake torque due to an on-demand brake fluid pressure generated in the on-demand brake pressure passage.

EFFECTS OF THE INVENTION

Therefore, in the brake device of the present invention, the brake fluid pressure can be decreased with a value proportional to the reaction force inputted to the fluid pressure brake. Accordingly, when the friction coefficient between the rotator and the braking means is high and the brake force applied from the braking means to the rotator is large, its reaction force becomes larger, brake fluid pressure to be decreased becomes larger by that amount. On the other hand, when the friction coefficient between the rotator and the braking means is small and the brake force applied from the braking means to the rotator is small, its reaction force becomes smaller, the fluid pressure to be decreased becomes smaller by that amount. In other words, in the fluid pressure brake, the brake fluid pressure to be decreased is mechanically determined according to a value of the reaction force, so that the variation in the brake force applied to the wheel can be suppressed regardless of the variation in the friction efficient between the rotator and the braking means.

BRIEF DESCRIPTION OF THE DRAWINGS

FIG. 9 is a view showing a reaction detecting mechanism of the brake device of the sixth embodiment;

FIGS. 10A and 10B are diagrams showing a characteristic of a relationship between a reaction force, solenoid electric current and a detected value of a load cell in the brake device of the sixth embodiment;

DESCRIPTION OF REFERENCE NUMBER 1 rotating electric machine,
M electric motor,
G reduction gears,
2 fluid pressure brake (braking means),
3 driving wheel (wheel),
4 cylinder case of rotating electric machine,
5 vehicle-body side cylinder case (vehicle side member),
6 ball,
7 master-cylinder fluid pressure chamber (on-demand brake fluid pressure chamber),
8 wheel-cylinder fluid pressure chamber,
9 return fluid pressure chamber,
10 communicating fluid pressure passage,
11 orifice,
12 valve hole (communicating fluid pressure passage),
13 wheel-cylinder fluid pressure modulator valve (valve means),
13a piston,
13b valve member,
14 working arm,
15-1 first feedback mechanism (pressure reduction means: mechanical feedback mechanism),
15-2 second feedback mechanism (pressure reduction means: mechanical feedback mechanism),
15-3 third feedback mechanism (pressure reduction means: mechanical feedback mechanism),
16 disk wheel,
17 brake caliper,
18 motor shaft,
19 output shaft of speed reducer,
20 brake disk (rotator),
21 elastic member,
22 brake pedal (brake operating means),
23 brake power booster,
24 master cylinder,
25 master-cylinder fluid pressure passage,
26 wheel-cylinder fluid pressure chamber,
27 wheel-cylinder fluid pressure passage,
28 reservoir,
29 return fluid pressure passage,
70 load cell (torque sensor),
71 pressure-reducing solenoid valve (valve means), and
72 orifice.

BEST MODE FOR CARRYING-OUT OF THE INVENTION

Hereinafter, the best mode that can realize a brake device for a motor vehicle of the present invention will be described based on a first to eighth embodiments with reference to the accompanying drawings.

Embodiment 1

First, its construction will be described.

Figure 1:
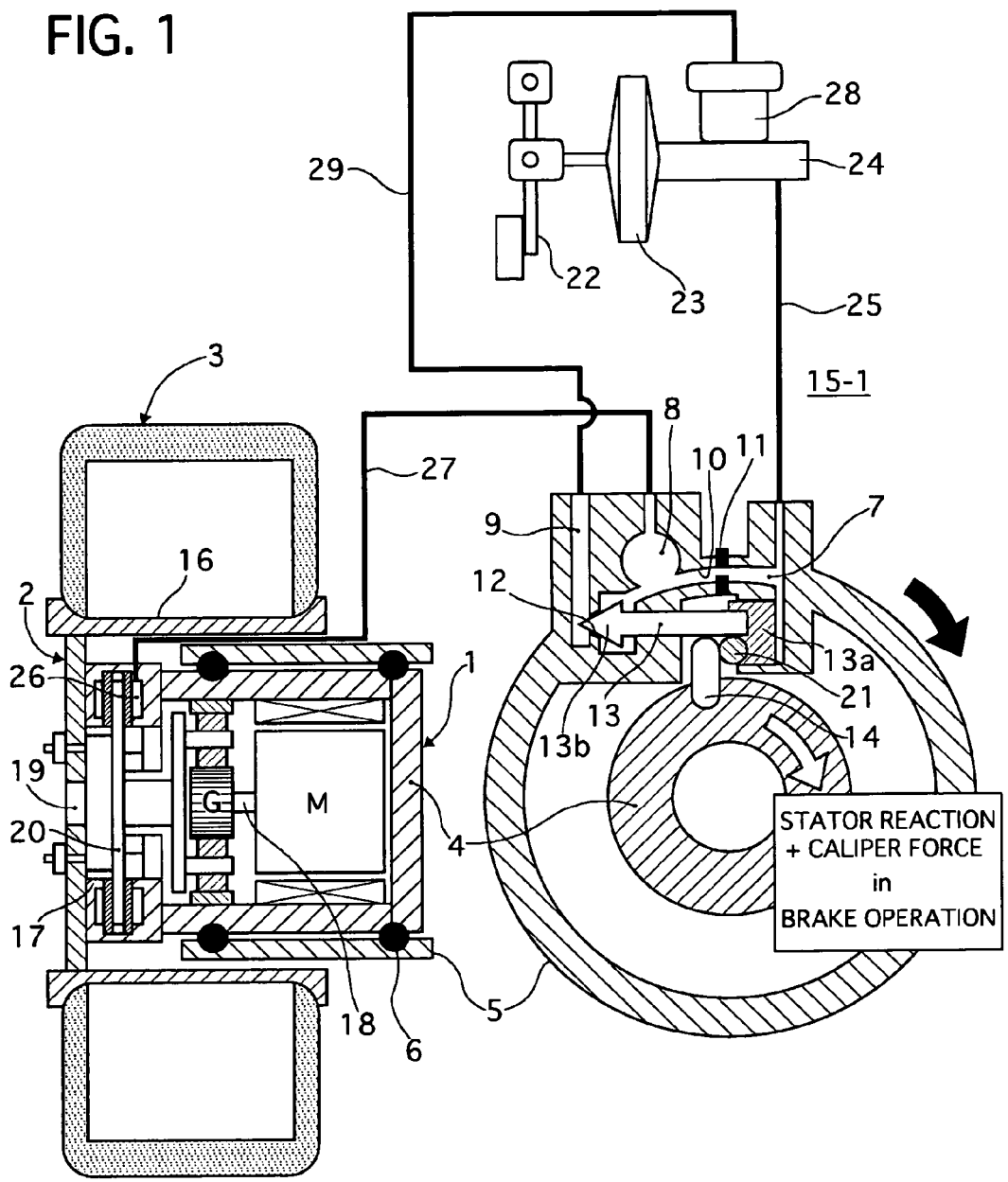
FIG. 1 is a diagram showing an entire system of a brake device for a motor vehicle of a first embodiment according to the present invention.

FIG. 1 is a diagram showing an entire system of a brake device adapted for a motor vehicle of a first embodiment.

The first embodiment is the brake device adapted for the motor vehicle. The brake device can apply brake torque to drive wheels 3, where the brake torque comprises regenerative brake torque TBe and fluid pressure brake torque TBp. The regenerative brake torque TBe is generated by a rotating electric machine 1 of an in-wheel motor type, while the fluid pressure brake torque TBp is generated by a fluid pressure brake 2 of a brake disk type.

A cylinder case 4 of the rotating electric machine 1 is supported by a vehicle-body side cylinder case 5 through balls 6 so that the machine side cylinder case 4 can move relative to the vehicle-body side cylinder case 5. The machine side cylinder case 4 corresponds to a brake reaction detecting means of the present invention, and the vehicle-body side cylinder case 5 corresponds to a vehicle side member of the present invention.

The vehicle-body side cylinder case 5 is formed with a master-cylinder fluid pressure chamber 7, a wheel-cylinder fluid pressure chamber 8 and a return fluid pressure chamber 9. An orifice 11 is provided in a communicating fluid pressure passage 10 connecting the master-cylinder fluid pressure chamber 7 and the wheel-cylinder fluid pressure chamber 8 with each other, and a wheel-cylinder fluid pressure modulator valve 13 is provided in a valve hole 12 connecting the wheel-cylinder fluid pressure chamber 8 and the return fluid pressure chamber 9 with each other.

The machine side cylindrical case 4 acts as a brake reaction detecting means of the present invention, the vehicle-body side cylindrical case 5 acts as a vehicle-body side member of the present invention, the master-cylinder fluid pressure chamber 7 also acts as an on-demand brake fluid pressure passage of the present invention, the valve hole 12 acts as a first communicating fluid pressure passage of the present invention, and the communicating fluid pressure passage 10 acts as a second communicating fluid pressure passage of the present invention.

The wheel-cylinder fluid pressure modulator valve 13 has a first feedback mechanism 15-1 for modulating a wheel cylinder fluid pressure Pw so that an on-demand brake torque TB* due to master cylinder fluid pressure Pm can be balanced with the sum torque of the regenerative brake torque TBe obtained through a working arm 14 of the machine side cylindrical case 4 and the fluid pressure brake torque TBp due to the wheel cylinder fluid pressure Pw, where the working arm 14 and the master cylinder fluid pressure Pm apply force in an opening direction of the wheel-cylinder fluid pressure modulator valve 13. The first feedback mechanism acts as a mechanical feedback mechanism of the present invention.

The rotating electric machine 1 is an in-wheel electric motor, and the motor M and reduction gears G are disposed in the machine side cylindrical case 4 that is fixed to an integral brake caliper 17 in a disk wheel 16. The motor M includes a rotor having an output shaft 18 and a stator fixed to the machine side cylindrical case 4, and the reduction gears G has a sun gear connected to the output shaft 18, a ring gear fixed to the machine side cylindrical case 4, a pinion carrier supporting pinions in mesh with the sun gear and the ring gear. The pinion carrier is connected to an output shaft 19 of the reduction gears G which fixes a brake disk 20 and the disk wheel 16.

The wheel-cylinder fluid pressure modulator valve 13 has a piston 13a and a valve member 13b, where the piston 13a is applied by torque in the opening direction when the master cylinder fluid pressure Pm generates, and the valve member 13b is connected to the piston 13a for moving to open and close the valve hole 12 formed through a partition wall between the wheel-cylinder fluid pressure chamber 8 and the return fluid pressure chamber 9.

The first feedback mechanism 15-1 modulates the wheel cylinder fluid pressure Pw so that a resultant torque TBt acting in the opening direction can be balanced with an on-demand brake torque TB* acting in the opening direction.

Herein, the resultant torque TBt is obtained by adding the regenerative brake torque TBe to the fluid pressure brake torque TBp. The regenerative brake torque TBe is obtained by multiplying a stator reaction force, including a reaction force of the reduction gears, due to regenerative brake by the motor M and the reduction gears G by a distance between a center of the wheel and an action point of the working arm 14. The on-demand brake torque TB* is obtained by multiplying an on-demand brake force having the product of the master cylinder fluid pressure Pm and the effective pressure-receiving area of the piston 13a by a distance between the center of the wheel and a application center point of the on-demand brake force.

Incidentally, an elastic member 21 is arranged between the working arm 14 and the piston 13a to suppress tapping noise generated by them.

The master-cylinder fluid pressure chamber 7 is providable via a master-cylinder fluid pressure passage 25 with the master cylinder fluid pressure Pm, which is produced by a master cylinder 24 driven by output force of a brake power booster 23 when a brake pedal 22 is pressed. The master-cylinder fluid pressure passage 25 acts as an on-demand brake pressure passage of the present invention.

The wheel-cylinder fluid pressure chamber 8 formed in the machine side cylinder case 4 and a wheel-cylinder fluid pressure chamber 26 formed in the brake caliper 17 are fluidically communicated with each other via a wheel-cylinder fluid pressure passage 27. The return fluid pressure chamber 9 and a reservoir 28 are also fluidically communicated via a return fluid pressure passage 29.

Next, its operation will be described.

In a brake operation, where the brake pedal 22 is pressed, the master cylinder fluid pressure Pm is conducted to the wheel-cylinder fluid pressure chamber 26 through the master-cylinder fluid pressure passage 25, the master-cylinder fluid pressure chamber 7, the communicating fluid pressure passage 10, the wheel-cylinder fluid pressure chamber 8 and the wheel-cylinder fluid pressure passage 27, thereby clamping the brake disk 20 of the fluid pressure brake 2 to apply its brake torque to the driving wheel 3.

In this brake operation, the on-demand brake torque, determined by multiplying an on-demand brake torque having the product of the master cylinder fluid pressure Pm and the effective pressure receiving area of the piston 13a by the distance between the center of the wheel and the application center point of the on-demand brake force, acts in the closing direction, while the fluid pressure brake torque TBp, having the product of caliper force acting on the machine side cylindrical case 4 through the brake caliper 17 as the reaction force due to the wheel cylinder fluid pressure Pw, and a distance between the center of the wheel and the action point of the working arm 14. Accordingly, the wheel-cylinder fluid pressure modulator valve 13 of the first feedback mechanism 15-1 maintains a closing state of the valve 13 as long as the demand torque TB* is larger than the fluid pressure brake torque TBp.

Adding the regenerative brake torque TBe generated by the rotating electric machine 1 to the fluid pressure brake torque TBp causes the wheel-cylinder fluid pressure modulator valve 13 to modulate a discharge amount of bake brake fluid from the wheel-cylinder fluid pressure chamber 8 to the return fluid pressure chamber 9 by opening and closing the valve 13 so that the sum torque of the regenerative brake torque TBe obtained through the working arm 14 and the fluid pressure brake torque TBp can be balanced with the on-demand brake torque TB* that is determined based on on-demand brake fluid pressure. Accordingly, the wheel cylinder fluid pressure Pw is modulated to be smaller as the regenerative brake torque TBe becomes larger when the on-demand brake torque TB* is constant.

This modulation of the wheel cylinder fluid pressure Pw is not implemented by an electric feedback control system using electric signals, but is implemented by a mechanical feedback mechanism using signal force, acting on the wheel-cylinder fluid pressure modulator valve 13, into which the on-demand brake force, the regenerative brake force and fluid pressure brake force are converted. Accordingly, the wheel-cylinder fluid pressure modulator valve 13 is automatically and mechanically closed to shift its braking operation from brake using the regenerative brake force to brake using only fluid pressure brake force, for example, when the regenerative brake force becomes zero due to a fail in an electric system while all brake torque is generated by the regenerative braking. This provides fail-safe even when the fluid pressure brake torque is not always remained.

In addition, the modulation operation of the wheel cylinder fluid pressure Pw is executed by a cooperative brake control, in which the best use of the regenerative brake torque TBe is made according to on-demand brake torque TB* and its shortage between them is compensated by the fluid pressure brake torque TBp so that they can satisfy an equation "the on-demand brake torque TB*=the regenerative brake torque TBe+the fluid pressure brake torque TBp".

Accordingly, the cooperative brake control for improving an energy recovery rate can be easily achieved by the mechanical mechanism regardless of the regenerative state of the rotating electric machine. The brake device of the first embodiment feedback-controls an actual brake torque, equal to the sum torque of the regenerative brake torque TBe and the fluid pressure brake torque TBp, so that the on-demand brake torque TB* can be equal to the actual brake torque independently from an in-mid-flow state and a state change of braking, differently from an electrically feedback control.

The rotating electric machine 1 is the in-wheel motor with the reduction gears, in which the electric motor M and the reduction gears G are disposed in the machine side cylindrical case 4 connected with the integrated brake caliper 17 in the driving wheel 16. This can feed back the actual brake force including the regenerative brake force and the fluid pressure brake force to the wheel-cylinder fluid pressure modulator valve 13 by the working arm 14 regardless of the variation in the friction coefficient of a brake friction member of the fluid pressure brake 2. This means that the first feedback mechanism 15-1 is effective in the rotating electric machine 1 of the in-wheel type shown in the first embodiment.

Further, the on-demand brake fluid pressure is set to be the master cylinder fluid pressure Pm generated by the master cylinder 24, which enables the wheel-cylinder fluid pressure modulator valve 13 to be constructed as a simple poppet valve, thereby improving reliability of the first feedback mechanism 15-1.

Next, its advantages will be described.

The brake device of the first embodiment has the advantages listed below.

(1) The brake device for motor vehicles, having the fluid pressure brake for applying the brake force according to the brake fluid pressure to the rotator fixed to the wheel, is provided with the wheel-cylinder pressure modulator valve for modulating the wheel-cylinder pressure so that the fluid pressure torque can be decreased based on the brake reaction torque and the on-demand brake torque during the brake operation. The variation in the brake force acting on the wheel can be suppressed regardless of the variation in the friction coefficient between the rotor and the braking means in the fluid pressure brake.

(2) The wheel-cylinder pressure modulator valve is capable of shifting between a maintaining state and a reducing state of the brake fluid pressure, where the reaction force is applied to the fluid pressure brake in the direction in which the brake fluid pressure is decreased. This valve shifting operation between the maintaining state and the reducing state of the brake fluid pressure can control the brake fluid pressure to be decreased according to the reaction force inputted to the fluid pressure brake.

(3) The brake device is provided with the brake reaction detecting means for detecting the reaction force inputted to the braking means, and the detected reaction force is applied to the valve means so as to decrease the brake fluid pressure. This can provide the control that decreases the brake fluid pressure based on the mechanically detected reaction force of the brake force.

(4) The brake reaction detecting means is provided swingably relative to the vehicle body side, and the fluid pressure brake and the brake reaction detecting means are integrated with each other so that an amount of the reaction force inputted to the fluid pressure brake is changed into a displacement in a swing movement of the brake reaction force detecting means. Therefore, the brake reaction means can easily detect the reaction force inputted to the fluid pressure brake based on a swing movement displacement.

(5) The drive device (the rotating electric machine 1) is provided to apply its drive force to the wheel, and the brake reaction detecting means comprises the drive device case (the machine side cylindrical case 4) containing the rotating electric machine 1.

Therefore, the brake reaction force can be easily detected by using the drive device case, which brings the brake reaction detecting means to be a simple construction.

(6) The rotating electric machine 1 is provided to apply the regenerative brake force to the wheel, and the brake reaction detecting means comprises the drive device case (the machine side cylindrical case 4) containing the rotating electric machine 1. Therefore, the brake reaction force can be easily detected by using the drive device case, which brings the brake reaction detecting means to be a simple construction.

(7) In the brake device for motor vehicles which applies the brake torque to the wheel 3 due to the regenerative torque TBe by the rotating electric machine 1 and the fluid pressure brake torque TBp by the fluid pressure brake 2, the machine side cylindrical case 4 of the rotating electric machine 1 is supported movably relative to the vehicle body side cylindrical case 5 formed with on-demand brake fluid pressure chamber, the wheel-cylinder fluid pressure chamber 8 and the return fluid pressure chamber 9. In addition, the orifice 11 is provided in the communicating fluid pressure passage 10 formed between the on-demand brake fluid pressure chamber and the wheel-cylinder fluid pressure chamber 8, and the wheel-cylinder fluid pressure modulator valve 13 is provided in the communicating pressure passage formed between the wheel-cylinder fluid pressure chamber 8 and the return fluid pressure chamber 9. The pressure reducing means is constructed as the mechanically feedback mechanism, which modulates the wheel cylinder fluid pressure Pw so that the sum torque of the regenerative brake torque TBe, acting on the wheel-cylinder fluid pressure modulator valve 13 via the working arm 14 provided on the machine side cylindrical case 4 in the opening direction of the valve 13, and the fluid pressure brake torque TBp, acting in the opening direction due to the wheel cylinder fluid pressure Pw can be balanced with the on-demand brake torque TB* acting in the closing direction of the valve 13 due to the on-demand brake fluid pressure. This can provide a fail-safe when all of brake energy is regenerated, thereby establishing the cooperative brake control for improving the energy recovery efficiency only by mechanical parts regardless of its regenerative state.

(8) The rotating electric machine 1 is the in-wheel motor with the reduction gears, in which the motor M and the reduction gears G are arranged in the machine side cylindrical case 4 fixed to the integral brake caliper 17 in the driving wheel 16. The wheel-cylinder fluid pressure modulator valve 13 has the piston 13a and the valve member 13b connected with the piston 13a, where one edge portion of the piston 13a is disposed in the on-demand brake fluid pressure chamber so that the piston 3a can be urged by the torque in the closing direction of the valve 13 when the on-demand brake fluid pressure is generated, and the valve member 13b opens and closes the valve hole 12 formed in the partition wall between the wheel-cylinder fluid pressure chamber 8 and the return fluid pressure chamber 9. The mechanically feedback mechanism employs the first feedback mechanism that modulates the wheel cylinder fluid pressure Pw so that the torque acting on the piston 13a through the working arm 14 in the opening direction can be balanced with the on-demand brake torque TB*, due to operating directional force determined by the product of the master cylinder fluid pressure Pm multiplied by its effective pressure receiving area. This can feed back the actual brake force including the regenerative brake force and the fluid pressure brake force to the wheel-cylinder fluid pressure modulator valve 13 by the working arm 14 in high accuracy regardless of the variation in the friction efficient of the brake friction member of the fluid pressure brake 2.

(9) The on-demand brake fluid pressure chamber is the master-cylinder fluid pressure chamber 7 conducting the master cylinder fluid pressure Pm generated by the master cylinder 24 when the brake pedal 22 is pressed. Therefore, this enables the wheel-cylinder fluid pressure chamber 13 to be simply constructed, such as a poppet valve, thereby improving the reliability of the first feedback mechanism 15-1 when it is used under its harsh environment.

Embodiment 2

A second embodiment of the present invention is an example effective in a system having on-vehicle electric motor which can decrease its unsprung weight.

First, its construction will be described.

Figure 2:
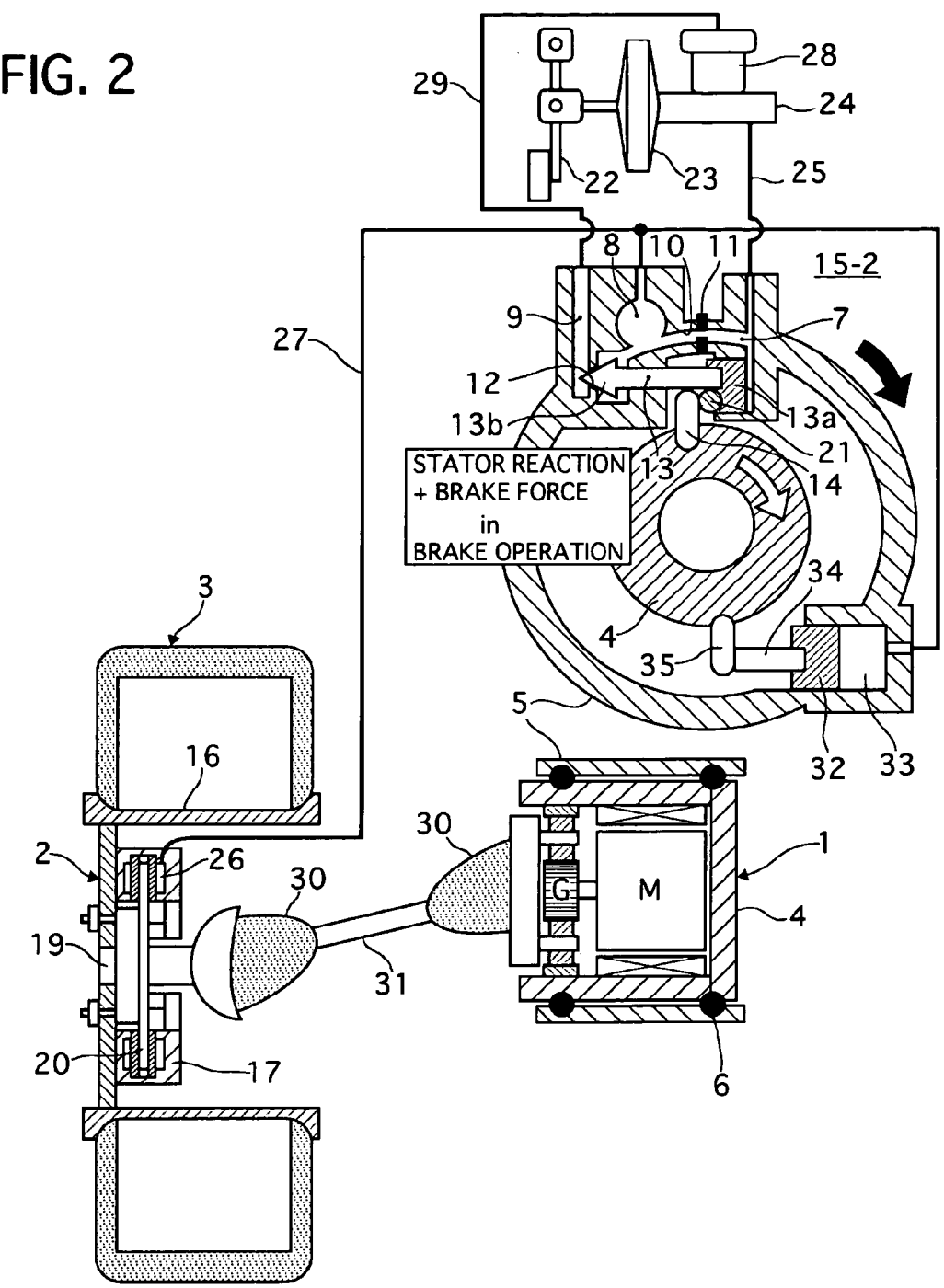
FIG. 2 is a diagram showing an entire system of a brake device for a motor vehicle of a second embodiment according to the present invention.

As shown in FIG. 2, a rotating electric machine 1 of the second embodiment is an in-wheel motor with reduction gears, in which an electric motor M and the reduction gears G are arranged in a machine side cylindrical case 4 separated from a brake caliper 17 in a driving wheel 16. Because of separation of the on-vehicle motor M from the caliper 17, a pinion carrier of the reduction gears G and its output shaft 19 are connected with each other by a drive shaft 31 via universal joints 30, 30 disposed at the both end portion of the drive shaft 31.

A wheel-cylinder fluid pressure modulator valve 13 is, similarly to the first embodiment, provided with a first piston 13a and a valve member 13b connected with the first piston 13a, where one end portion of the first piston 13a is disposed in a master-cylinder fluid pressure chamber 7 to be urged in an opening direction of the valve 13 when master cylinder fluid pressure Pm is generated, and the valve member 13b opens and closes a valve hole 12 formed in a partition wall between a first wheel-cylinder fluid pressure chamber 8 and a return fluid pressure chamber 9.

In a wheel body side cylindrical case 5, a second wheel-cylinder fluid pressure chamber 33 with a second piston 32 are formed at a position distanced from the first wheel-cylinder fluid pressure chamber 8 in a circumferential direction of the case 5. The machine side cylindrical case 4 is provided with a second working arm 14 receiving torque in the opening direction from a piston rod 34 of the second piston 32 when wheel cylinder fluid pressure Pw is generated.

A mechanically feedback mechanism employs a second feedback mechanism that modulates the wheel cylinder fluid pressure Pw so that a torque acting on the first piston 13a through a first working arm 14 provided on the machine side cylindrical case 4 in the opening direction can be balanced with an on-demand brake torque TB* due to operating directional force determined by the product of the master cylinder fluid pressure Pm multiplied by its effective pressure receiving area of the first piston 13a.

Incidentally, other parts of the second embodiments are similar to those of the first embodiment, and their corresponding parts are indicated by the same reference numbers and their explanations are omitted.

In its operation, the brake device of the first embodiment obtains fluid pressure brake force from caliper force, while the brake device of the second embodiment obtains the brake force from force determined by multiplying the wheel cylinder fluid pressure Pw by an effective pressure receiving area of the second piston 32.

Next, its effect will be described.

The brake device of the second embodiment can obtain an additional advantage listed below in addition to the advantages (1) to (7), and (9) described in the first embodiment.

(10) The rotating electric machine 1 is the in-wheel motor with reduction gears, in which the electric motor M and the reduction gears G are arranged in the machine side cylindrical case 4 separated from the brake caliper 17 in the driving wheel 16. The wheel-cylinder fluid pressure modulator valve 13 is provided with the first piston 13a and the valve member 13b connected with the first piston 13a, where one end portion of the first piston 13a is in the master-cylinder fluid pressure chamber 7 to receive torque in the opening direction of the valve 13 when master cylinder fluid pressure Pm is generated, and the valve member 13b opens and closes the valve hole 12 formed in the partition wall between the first wheel-cylinder fluid pressure chamber 8 and the return fluid pressure chamber 9. In the wheel body side cylindrical case 5, the second working arm 14 is provided for receiving torque in the opening direction from the piston rod 34 of the second piston 32 when the wheel cylinder fluid pressure Pw is generated. The mechanically feedback mechanism employs the second feedback mechanism 15-2 that modulates the wheel cylinder fluid pressure Pw so that a torque acting on the first piston 13a through the first working arm 14 provided on the machine side cylindrical case 4 in the opening direction can be balanced with the on-demand brake torque TB* due to operating directional force determined by the product of the master cylinder fluid pressure Pm multiplied by its effective pressure receiving area of the first piston 13a. This can decrease the unsprung weigh to enable easy design and settings of a suspension, and feed back actual brake force including its regenerative brake force and fluid pressure brake force to the wheel-cylinder fluid pressure modulator valve 13 by using the first working arm 14.

Embodiment 3

A third embodiment is an example effective in a system having an on-vehicle electric motor which can decrease its unsprung weight, similarly to the second embodiment.

First, its construction will be described.

Figure 3:
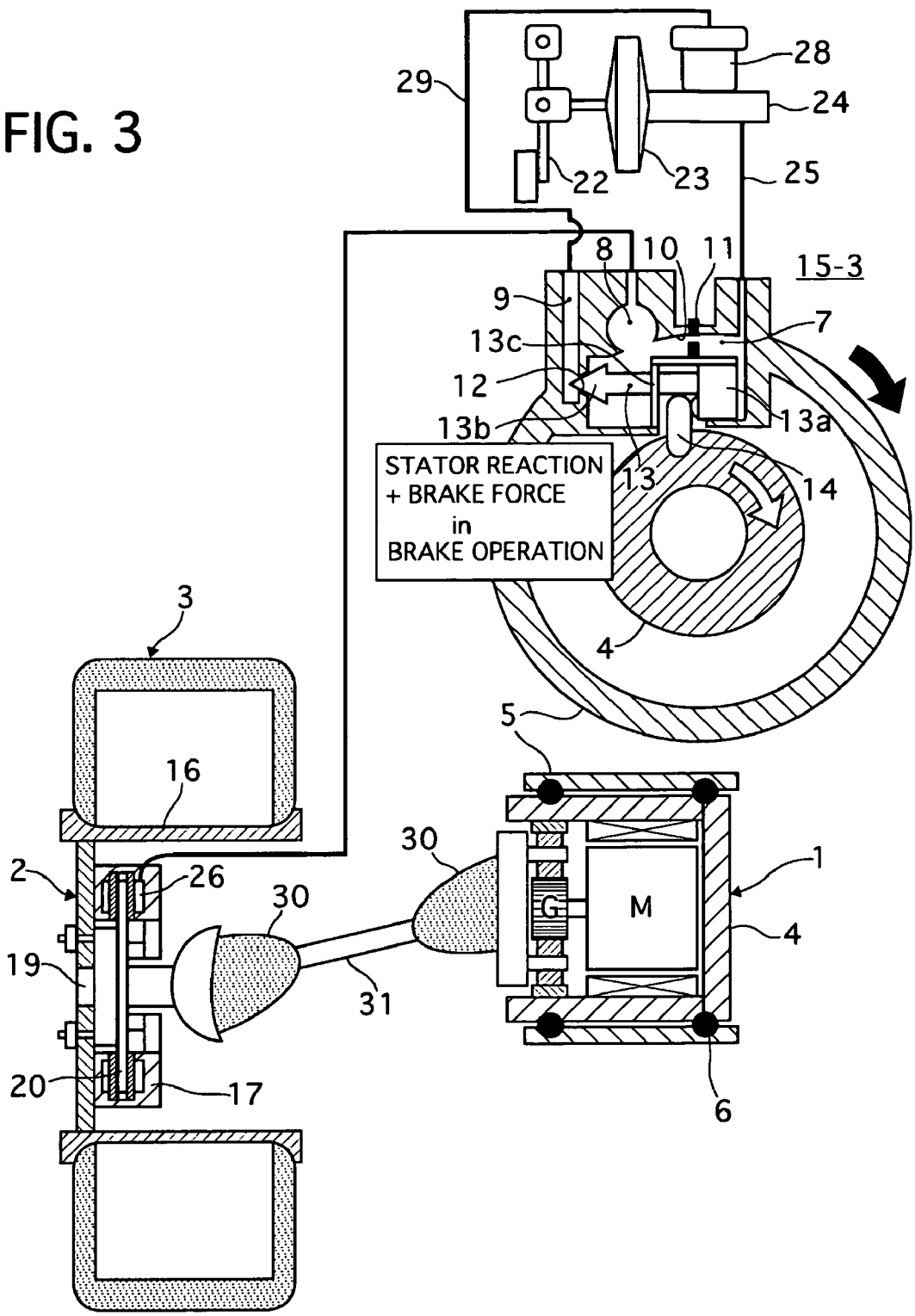
FIG. 3 is a diagram showing an entire system of a brake device for a motor vehicle of a third embodiment according to the present invention.

As shown in FIG. 3, a rotating electric machine 1 of the third embodiment is an in-wheel motor with reduction gears, in which an electric motor M and the reduction gears G are arranged in a machine side cylindrical case 4 separated from a brake caliper 17 in a driving wheel 16. Because of separation of the on-vehicle motor M from the caliper 17, a pinion carrier of the reduction gears G and its output shaft 19 are connected with each other by a drive shaft 31 via universal joints 30, 30 disposed at the both end portion of the drive shaft 31.

A wheel-cylinder fluid pressure modulator valve 13 is, similarly to the first embodiment, provided with a first piston 13a, a second piston 13c and a valve member 13b connected with the first piston 13a and the second piston 13c, where one end portion of the first piston 13a is disposed in a master-cylinder fluid pressure chamber 7 to be urged in an opening direction of the valve 13 when master cylinder fluid pressure Pm is generated, the second piston 13c receives torque in the opening direction when the wheel cylinder fluid pressure Pw is generated, and the valve member 13b opens and closes a valve hole 12 formed in a partition wall between a first wheel-cylinder fluid pressure chamber 8 and a return fluid pressure chamber 9.

A mechanically feedback mechanism employs a third feedback mechanism that modulates the wheel cylinder fluid pressure Pw so that that the sum torque of the regenerative brake torque TBe, acting on the first piston 13a through the first working arm 14 provided on the machine side cylindrical case 4 in the opening direction, and the fluid pressure brake torque TBp, in the opening direction, which is determined by the product of the wheel cylinder fluid pressure Pw and an effective pressure receiving area of the second piston 13c can be balanced with the on-demand brake torque TB* due to operating directional force determined by the product of the master cylinder fluid pressure Pm multiplied by its effective pressure receiving area of the first piston 13a a torque acting on the first piston 13a through a first working arm 14 provided on the machine side cylindrical case 4 in the opening direction can be balanced with an on-demand brake torque TB* due to operating directional force determined by the product of the master cylinder fluid pressure Pm multiplied by its effective pressure receiving area. Incidentally, other parts of the third embodiments are similar to those of the first embodiment, and their corresponding parts are indicated by the same reference numbers and their explanations are omitted.

In operation, the brake device of the second embodiment obtains the opening directional fluid pressure brake torque TBp determined by multiplying the wheel cylinder fluid pressure Pw by the effective pressure receiving area of the second piston 32, separated from the wheel-cylinder fluid pressure modulator valve 13, while the brake device of the third embodiment obtains the opening directional fluid pressure brake torque TBp determined by multiplying the wheel cylinder fluid pressure Pw and an effective pressure receiving area of the second piston 13c integrally provided with the wheel-cylinder fluid pressure modulator valve 13.

Next, its advantages will be described.

The brake device of the third embodiment can obtain an additional advantage listed below in addition to the advantages (1) to (7) described in the first embodiment.

(11) The rotating electric machine 1 is the in-wheel motor with reduction gears, in which the electric motor M and the reduction gears G are arranged in the machine side cylindrical case 4 separated from the brake caliper 17 in the driving wheel 16. The wheel-cylinder fluid pressure modulator valve 13 is provided with the first piston 13a, the second piston 13c and the valve member 13b connected with the first piston 13a and the second piston 13c, where one end portion of the first piton 13a is in the master-cylinder fluid pressure chamber 7 to receive torque in the opening direction of the valve 13 when master cylinder fluid pressure Pm is generated, one end portion of the second piston 13c is in the wheel-cylinder fluid pressure chamber 8 to receive torque in the opening direction when the wheel cylinder fluid pressure Pw is generated, and the valve member 13b opens and closes the valve hole 12 formed in the partition wall between the first wheel-cylinder fluid pressure chamber 8 and the return fluid pressure chamber 9. The mechanically feedback mechanism employs the third feedback mechanism 15-3 that modulates the wheel cylinder fluid pressure Pw so that the sum torque of the regenerative brake torque TBe, acting on the first piston 13a through the first working arm 14 provided on the machine side cylindrical case 4 in the opening direction, and the fluid pressure brake torque TBp, acting in the opening direction and determined by the product of the wheel cylinder fluid pressure Pw and the effective pressure receiving area of the second piston 13c, can be balanced with the on-demand brake torque TB* due to operating directional force determined by the product of the master cylinder fluid pressure Pm multiplied by its effective pressure receiving area of the first piston 13a. This can decrease the unsprung weigh to enable easy design and settings of a suspension, and feed back actual brake force including its regenerative brake force and fluid pressure brake force to the wheel-cylinder fluid pressure modulator valve 13 by using the first working arm 14 without the additional piston of the second embodiment.

Embodiment 4

The fourth embodiment is an example which has an Antilock Braking System (hereinafter, abbreviated as "ABS") provided at a downstream side of a master cylinder and uses an ABS brake fluid pressure chamber as an on-demand brake fluid pressure chamber, replacing on-demand brake fluid pressure of the first and second embodiments by ABS brake fluid pressure.

Figure 4:
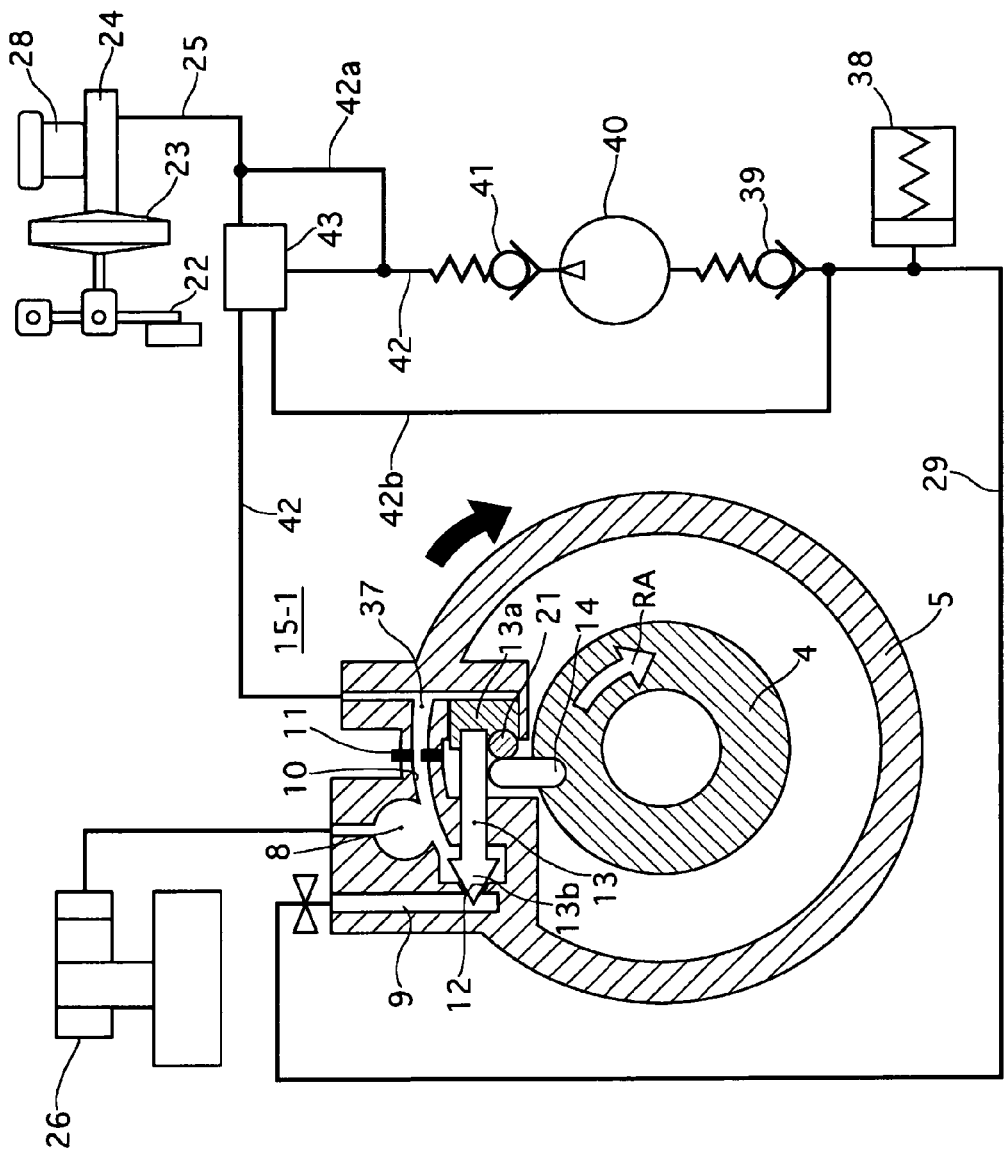
FIG. 4 is a diagram showing an entire system of a brake device for a motor vehicle of a fourth embodiment according to the present invention.

As shown in FIG. 4, the on-demand brake fluid pressure chamber is the ABS brake fluid pressure chamber 37 to which the ABS brake fluid pressure is conducted from the ABS system (FIG. 4 shows an ABS fluid pressure source for one wheel excluding a control valve and others.) at the downstream side of the master cylinder 24.

The ABS fluid pressure source for one wheel has, as shown in FIG. 4, a reservoir 38, a first check valve 41, an fluid pump 40, and a second check valve 39, where an inlet port side of the fluid pump 40 and a return fluid pressure chamber 9 are communicated with each other via a return fluid pressure passage 29, and its outlet port side is connected with an ABS brake fluid pressure passage 42. The ABS brake fluid pressure passage 42 acts as the on-demand brake pressure passage of the present invention.

Next, the ABS system will be described.

As shown in FIG. 4, the ABS system includes an accumulator 38 for accumulating brake fluid pressure, the first check valve 41, the fluid pump 40, the second check valve 39, a second solenoid valve 43 for producing the ABS brake fluid pressure PABS, and the ABS brake fluid pressure passage 42 fluidically connected with the downstream side of a master-cylinder fluid pressure passage 25.

The master-cylinder fluid pressure passage 25 and the second solenoid valve 43 are communicated with each other via a supply passage 42a, and the second solenoid valve 43 and the return fluid pressure passage 29 are communicated with each other via a discharge passage 42b. The return fluid pressure passage 29 are fluidically connected with the accumulator 38 and a return chamber 9.

The first check valve 41 allows only a flow of brake fluid from the fluid pump 40 toward the second solenoid valve 43, and the second check valve 39 allows a flow of the brake fluid from the accumulator 38 toward the fluid pump 40. The second solenoid valve 43 is shiftable between a plurality of operation modes, where the master cylinder fluid pressure Pm is transmitted through the master-cylinder fluid pressure passage 25 to the ABS brake fluid pressure chamber 37 in a normal mode, the ABS fluid pressure PABS is increased and supplied from the fluid pump 40 to the ABS brake fluid pressure chamber 37 in an increasing mode, the ABS brake fluid pressure PABS in a wheel-cylinder ABS brake fluid pressure chamber 38 is maintained in a maintaining mode, and the ABS brake fluid pressure PABS in a wheel-cylinder ABS brake fluid pressure chamber 38 is decreased in a reducing mode.

The other parts of the fourth embodiment is similar to those of the first embodiment.

In operation of the brake device of the fourth embodiment, the brake fluid conducted to the return fluid pressure chamber 9 due to pressure modulating operation by a wheel-cylinder fluid pressure modulator valve 13 is returned to the reservoir 38 of the ABS fluid pressure source through the return fluid pressure passage 29. Incidentally, the other operation of the fourth embodiment is similar to that of the first embodiment, replacing the master cylinder fluid pressure Pw by the ABS brake fluid pressure PABS, and accordingly its explanation is omitted.

Next, its advantages will be described.

The brake device of the fourth embodiment can obtain an additional advantage listed below in addition to the advantages (1) to (9) described in the first embodiment.

(12) The on-demand brake fluid pressure chamber is the ABS brake fluid pressure chamber 37 to which the ABS brake fluid pressure PABS is conducted from the ABS system provided at the downstream side of the master cylinder 24. Therefore, the fluid pump 40 as the ABS fluid pressure source can be also used as the return pump, thereby removing another fluid pump.

Embodiment 5

A fifth embodiment is an example that ensures safe and certain operation of the ABS system by stopping regenerative braking during an ABS operation.

Figure 5:
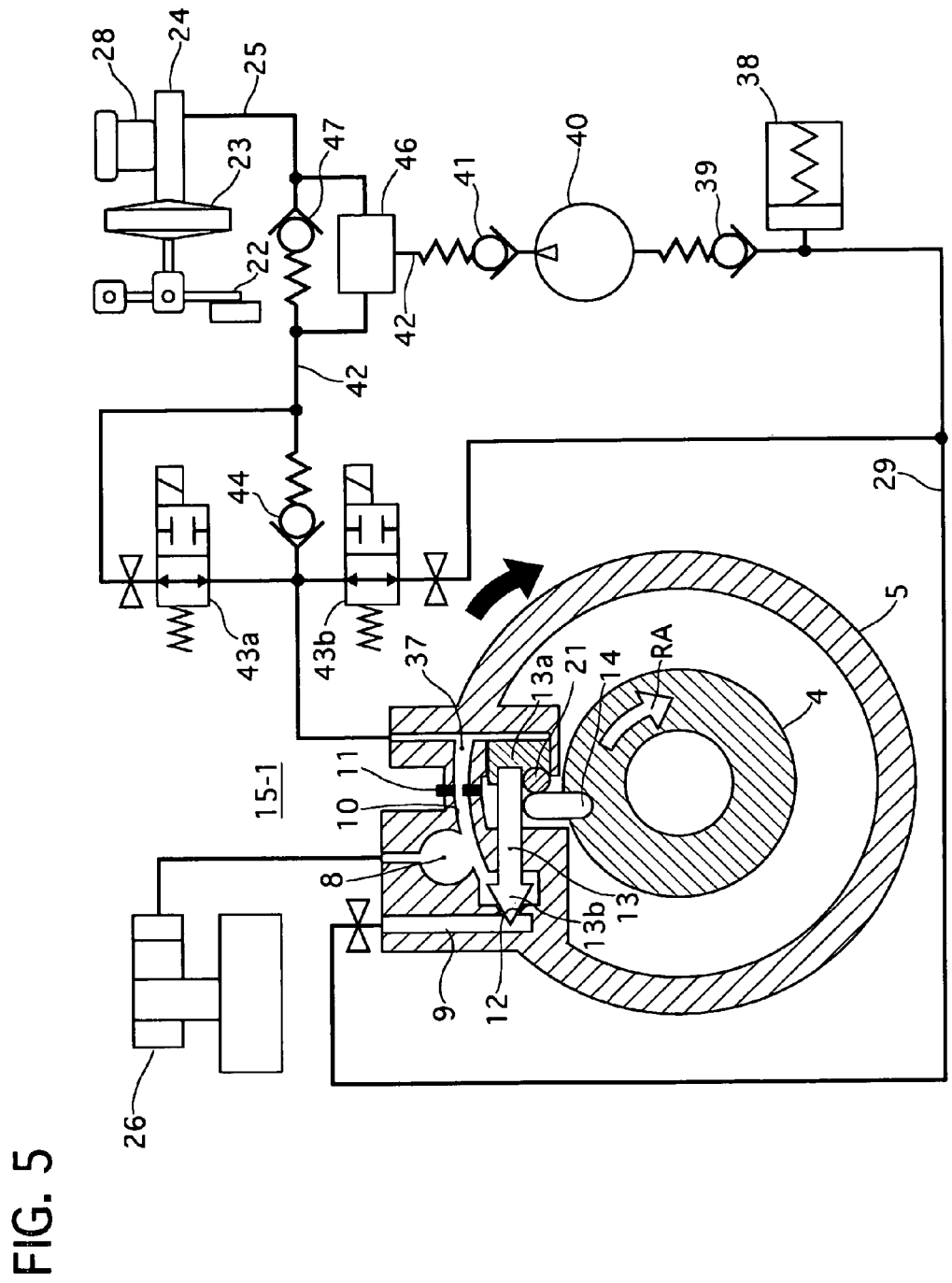
FIG. 5 is a diagram showing an entire system of a brake device for a motor vehicle of a fifth embodiment according to the present invention.

A electromechanical construction of the ABS system includes, as shown in FIG. 5 (only for one wheel), an ABS fluid pressure source, solenoid valves such as a pressure-increasing solenoid valve 43a and a pressure-reducing valve 43b, and a fourth check valve 44 in an ABS fluid circuit provided at a downstream side of a master cylinder 24.

Figure 6:
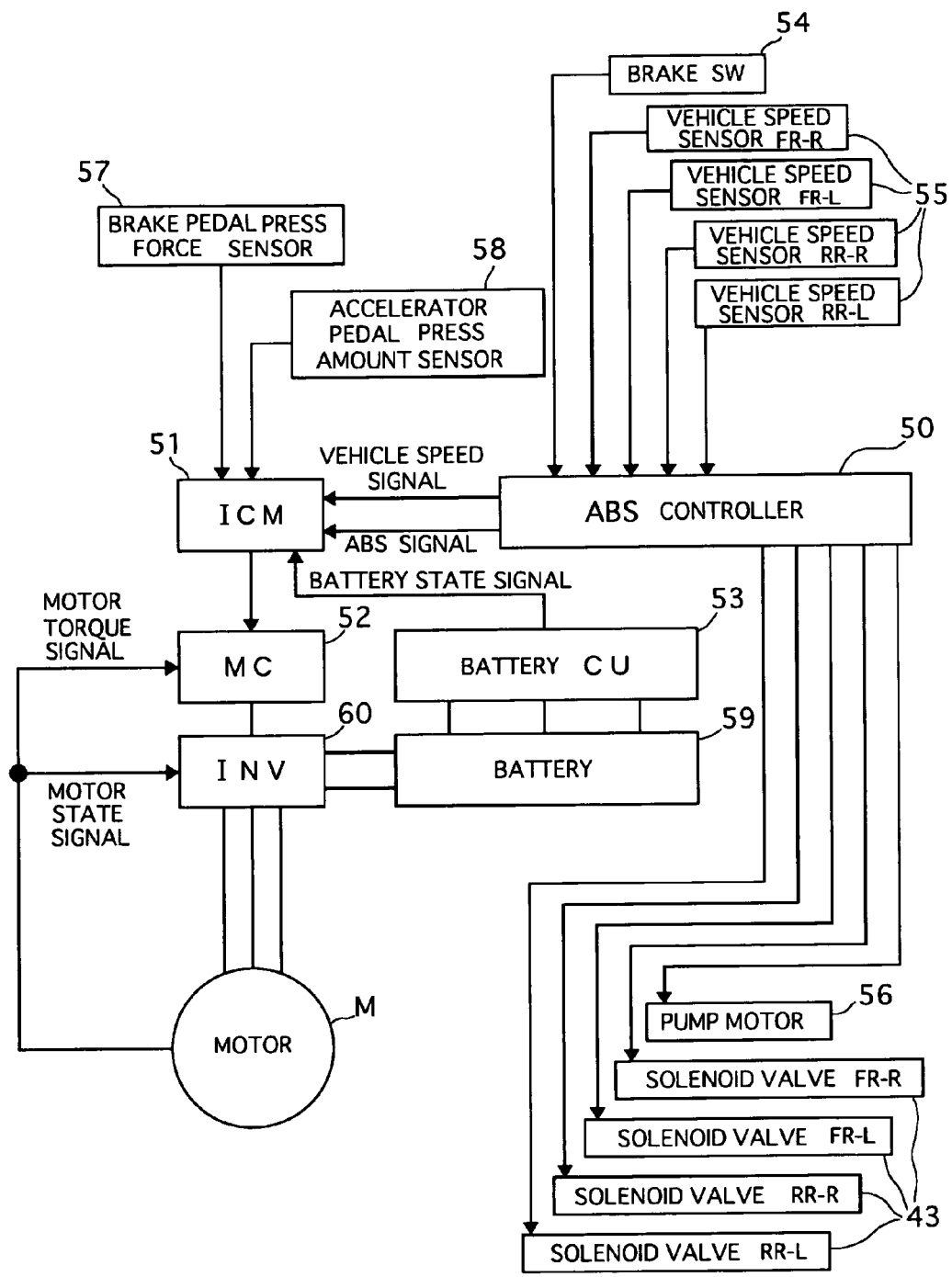
FIG. 6 is a block diagram showing a control system used in the brake device for the motor vehicle of the fifth embodiment.

On the other hand, an electronic construction of the ABS system includes, as shown in FIG. 6, an ABS controller 50, an integral control module (IME) 51, a motor controller (MC) 52, and a battery control unit 53.

The ABS controller 50 receives signals outputted from a brake switch 54 and vehicle speed sensors 55 of wheels to output a command signal to a pump motor 56 for driving an oil pump 40 and solenoid valves 43, including the pressure-increasing valve and the pressure-reducing valve, for each (front right FR-R, front left FR-L, rear right RR-R and rear left RR-L) wheel when a brake lock state is judged based on information on each wheel speed in a brake operation. The vehicle speed sensor 55 acts as a wheel speed sensor of the present invention.

The integral control module 51 receives a brake pedal press force signal outputted from a brake pedal press force sensor 57, an accelerator pedal press amount signal outputted from an accelerator pedal press amount sensor 58, vehicle speed signals and an ABS signal outputted from the ABS controller 50, and a battery state signal outputted from the battery control unit 53 to output a motor torque signal to the motor controller 52.

The motor controller 52 receives the motor torque signal outputted from the integral control module 51 and a motor state signal outputted from the electric motor M to output a motor drive command signal to an inverter 60 connected to a battery 59 as a direct current power source. Power running and regeneration of the three phase alternating current electric motor M is controlled according to the motor drive command signal.

The ABS system of this embodiment is different from that of the fourth embodiment in the following.

A master-cylinder fluid pressure passage 25 and a ABS brake fluid pressure passage 42 are fluidically communicated with each other via a shut-off valve 46 and a third check valve 47. The shut-off valve 46 is opened to fluidically communicate the master-cylinder fluid pressure passage 25 and an ABS brake fluid pressure chamber 37 formed in a machine-side cylindrical case 5 when the ABS system is not operated, and closed to shut the communication between them when the ABS system is operated. The third check valve 47 allows only a flow of brake fluid from the master-cylinder fluid pressure passage 25 toward the fourth check valve 44. The fourth check valve 44 allows only a flow of the brake fluid from the shut-off valve 46 toward the ABS brake fluid pressure chamber 37.

The pressure-increasing solenoid valve 43a is arranged in parallel with the fourth check valve 44 to increase the ABS brake fluid pressure PABS to be supplied to the ABS brake fluid pressure chamber 8, and the pressure-reducing solenoid valve 43b decreases the ABS brake fluid pressure PABS supplied to the ABS brake fluid pressure chamber 37. The pressure-reducing solenoid valve 43b is fluidically connected with the return fluid pressure passage 29 that communicates the return fluid pressure chamber 9 and an accumulator 38 with each other. The other parts of the fifth embodiment is similar to those of the fourth embodiment.

In this brake system, the shut-off valve 46 is opened when the ABS system is not operated. This causes the master cylinder fluid pressure to be transmitted from the master cylinder 24 to the ABS brake fluid pressure chamber 37 through the master-cylinder fluid pressure passage 25, the ABS brake fluid pressure passage 42 and the pressure-increasing solenoid valve 45a, and then to a wheel cylinder 26 through a wheel-cylinder fluid pressure chamber 8 of a fluid pressure brake 2 and a wheel-cylinder fluid pressure passage 27 to apply brake torque to the wheel.

When the ABS system is operated, the shut-off valve 46 shuts a communication between the master-cylinder fluid pressure passage 25 and the ABS brake fluid pressure passage 42 to supply pressured brake fluid from the fluid pump 40 to the pressure-increasing solenoid valve 43a to function the ABS system. In this ABS brake operation, the pressure-increasing solenoid valve 45a and the pressure-reducing valve 43b increase, maintain and reduces the ABS brake fluid pressure PABS to be supplied to the ABS fluid pressure chamber 37 according to a state of the wheel. Incidentally, the other parts shown in FIG. 5 are similar to those of the first embodiment, and the corresponding parts are indicated by the same reference numbers and their explanations are omitted.

Next, its operation will be described.
[Motor Control]

Figure 7:
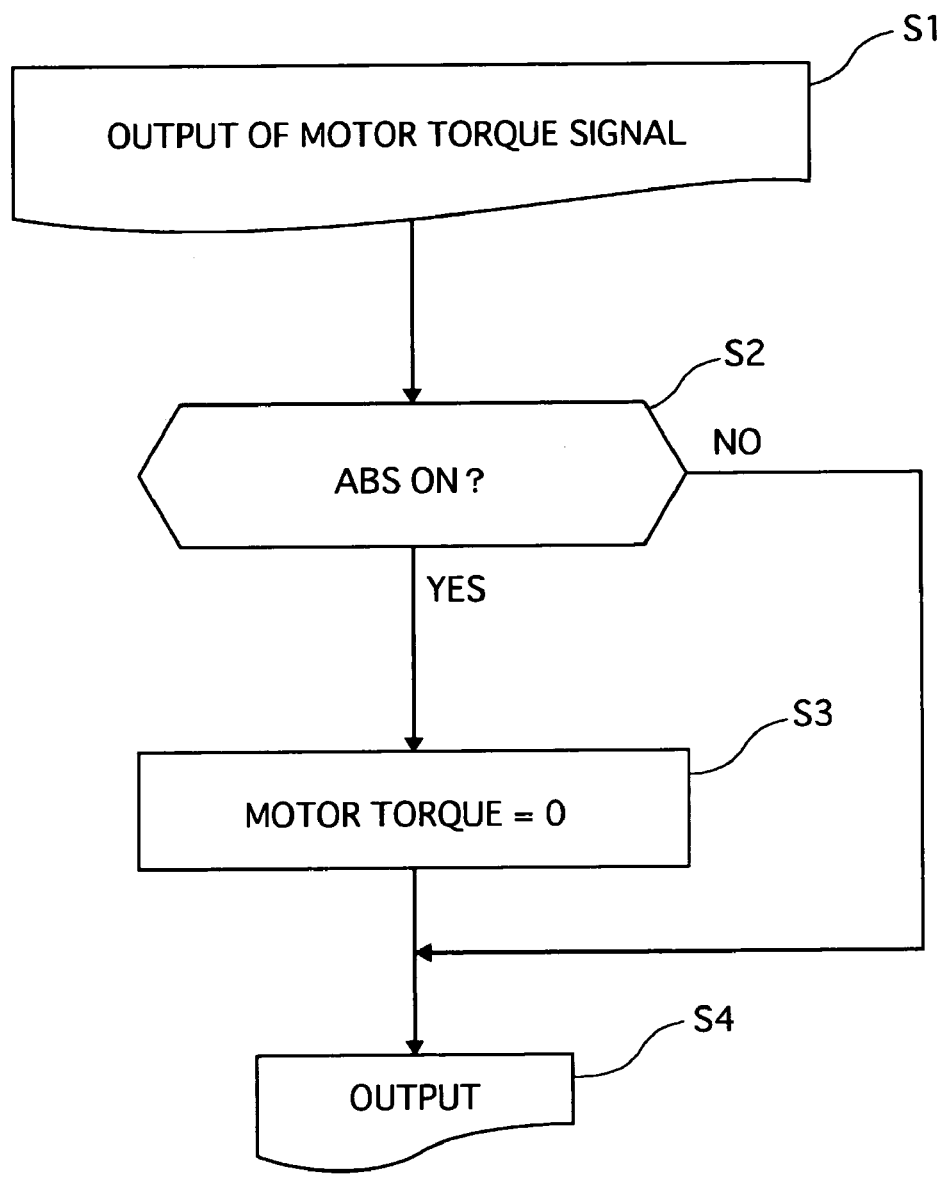
FIG. 7 is a flowchart showing a control flow of motor control executed by an integration control module used in the fifth embodiment.

FIG. 7 is a flowchart of a control flow of motor control executed by an integral control module 51, and their steps will be described below. These steps correspond to a brake control means of the present invention.

At step S1, the integral control module 51 receives a brake pedal press force signal outputted from the brake pedal press force sensor 57, an accelerator pedal press amount signal outputted from the accelerator pedal press amount sensor 58, a vehicle speed signal outputted through the ABS controller 50 and a battery state signal outputted from the battery control unit 53 to produce a motor torque signal to be outputted to the motor controller 52.

At Step 2, the integral control module 51 judges whether or not the ABS signal outputted from the ABS controller 50 is ON. If YES, the control flow goes to Step S3, while, if NO, it goes to step S4.

At the Step S3, motor torque to be output according to the motor torque signal is set to be zero, and the control flow goes to the step S4.

At the step S4, the integral control module 51 outputs a normal motor torque signal to the motor controller 52 when the ABS signal outputted from the ABS controller 50 is OFF, while it outputs the motor torque signal indicating zero torque when the ABS signal outputted from the ABS controller 50 is ON.

[Motor Control Operation]

Accordingly, in the ABS operation, the control flow goes from the step S1, the step S2, the step S3, and then the step S4 in the flowchart of FIG. 7. At the step S4, the motor torque signal is set to be zero, causing stop of the regenerative brake by the electric motor M.

This can safely and certainly execute the ABS control by instantly stopping the regenerative brake even when tire lock is caused due to the electrically generated brake torque during the ABS operation.

Next, its advantages will be described.

The brake device of the fifth embodiment can obtain an additional advantage listed below in addition to the advantages (1) to (9) described in the first embodiment.

(13) The brake device of the fifth embodiment has the brake control means for stopping the regenerative brake by the electric motor M during the ABS operation, the ABS control can be executed safely and certainly even when tire lock is caused due to the electrically generated brake torque during the ABS operation.

Embodiment 6

A sixth embodiment is an example in which brake reaction force is electrically detected and an electric feedback circuit is provided so as to control a pressure-reducing valve that reduces brake fluid pressure.

Figure 8:
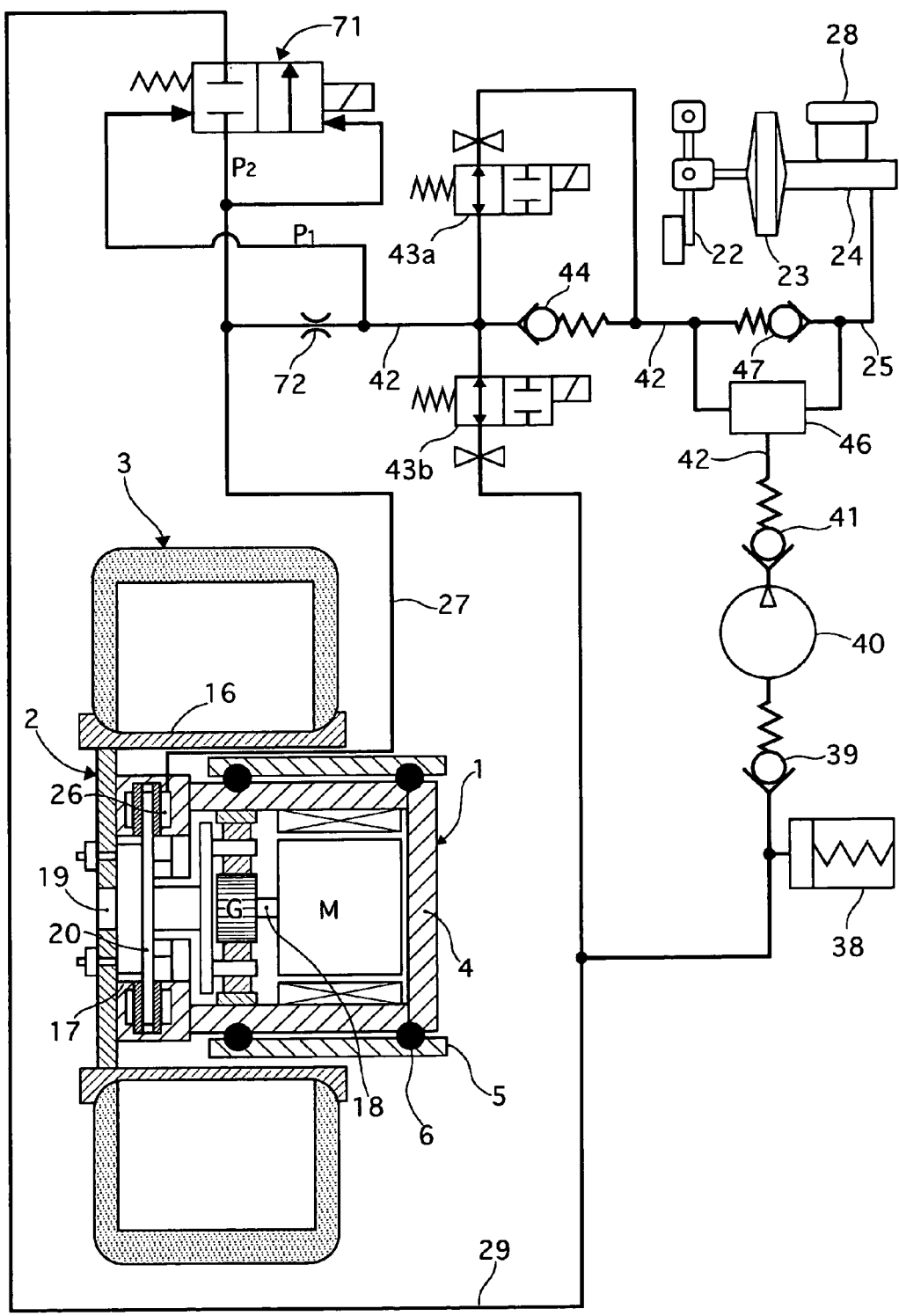
FIG. 8 is a diagram showing an entire system of a brake device for a motor vehicle of a sixth embodiment according to the present invention.

As shown in FIG. 8 and FIG. 9, a brake device of the sixth embodiment has a load cell 70, as a brake reaction force detecting means, which is arranged at a position between a machine-side cylindrical case 4 and a vehicle-body-side cylindrical case 5 and electrically detects the reaction force of fluid pressure brake force inputted to a brake caliper 17. The load cell 70 acts as a torque sensor of the present invention. Incidentally, a rotating electric machine 1 of the sixth embodiment is, similarly to that of the first embodiment, an in-wheel electric motor with reduction gears in which an electric motor M and the reduction gears G are arranged in the machine-side cylindrical case 4 connected with an integral brake caliper 17 in a driving wheel.

The pressure-reducing means is an electric feedback circuit that controls a pressure-reducing valve 71 for reducing brake fluid pressure according to a detected torque value outputted from the load cell 70. This electric feedback circuit has the pressure-reducing valve 71, which is arranged between a wheel-cylinder fluid pressure passage 27 conducting ABS brake fluid pressure from an ABS system provided at a downstream side of a master cylinder 24 to a wheel cylinder through an ABS fluid pressure passage 42, and a return fluid pressure passage 29 fluidically connected with an pump inlet port side of the ABS system, and controlled according to the detected torque value outputted from the load cell 70. Incidentally, an orifice 72 is provided between the ABS brake fluid pressure passage 42 and the wheel-cylinder fluid pressure passage 27 so as to separate the ABS brake fluid pressure (basic pressure) P1 and the wheel cylinder fluid pressure (pressure reduced according to a value detected by the load cell) P2 from each other.

The pressure-reducing valve 71 shifts its positions between a shut-off position and a communication position, and has a valve spool, which is urged by fluid pressure force due to the ABS brake fluid pressure P1 and spring force in a shut-off direction and also urged by fluid pressure force due to the wheel cylinder fluid pressure P2 and solenoid force in a communication direction (a pressure-reducing direction). The pressure-reducing valve 71 is shifted according to a balance of these forces. Incidentally, the other parts of the sixth embodiment are similar to those of the first, third and fourth embodiments, and the corresponding parts are indicated by the same reference numbers and their explanations are omitted.

Next, its operation will be described.

In the brake device of the sixth embodiments, the load cell 70 electrically detects regenerative brake torque inputted to the machine-side cylindrical case 4 and reaction force of the fluid pressure brake in the rotating electric machine of the in-wheel type shown in the first embodiment, and brake fluid pressure is reduced by controlling solenoid electric current to be supplied to the pressure-reducing solenoid valve 71.

That is, the load cell 70 outputs a load cell detected value according to reaction force inputted from a brake disk 20 to the brake caliper 17 as shown in FIG. 10A. A not-shown controller, receiving the detected value of the load cell, outputs solenoid electric current to the pressure-reducing solenoid valve 71 according to the detected value as shown in FIG. 10B. Therefore, at the beginning of a brake operation, the pressure-reducing solenoid valve 71 maintains its shut-off position because of the ABS brake fluid pressure P1 is larger than the wheel cylinder fluid pressure P2, and then the wheel cylinder fluid pressure P2 increases. When the ABS brake fluid pressure P1 becomes equal to the wheel cylinder fluid pressure P2 and the solenoid force is larger than the spring force, the pressure-reducing solenoid valve 71 is shifted from the shut-off position to the communication position to reduce the wheel cylinder fluid pressure P2. After that, when the ABS brake fluid pressure P1 becomes larger than the wheel cylinder fluid pressure P2 again, the pressure-reducing solenoid valve 71 is shifted from the communication position to the shut-off position. This means that as the solenoid force becomes larger, that is, as the reaction force inputted from the brake disk 20 to the brake caliper 17 becomes larger, the frequency of shifting to the communication position of the valve 71 becomes higher. As a result, the wheel cylinder fluid pressure is decreased. Incidentally, the other operations are similar to those in the mechanical feedback mechanism.

Next, its advantages will be described.

The brake device of the sixth embodiment can obtain additional advantages listed below in addition to the advantages (1) and (2) described in the first embodiment.

(14) The brake reaction force detecting means is the load cell 70 electrically detecting the reaction force of the fluid pressure brake inputted to the brake caliper 17, and the pressure-reducing means is the electric feedback mechanism that controls the pressure-reducing solenoid valve 71 for reducing the brake fluid pressure according to the detected torque value outputted from the load cell 70. This can provide pressure-reducing control for reducing the brake fluid pressure based on the electrically detected reaction force of the brake force by valve shift operation of the pressure-reducing solenoid valve 71 that shifts between maintaining and reducing of the brake fluid pressure.

(15) The rotating electric machine 1 is the in-wheel type electric motor with the reduction gears, in which the electric motor M and the reduction gears G are arranged in the machine-side cylindrical case 4 fixed to the integral brake caliper 17 in the driving wheel. The electric feedback circuit controls the pressure-reducing solenoid valve 71 according to the detected torque value outputted from the load cell 70, where the pressure-reducing solenoid valve 71 is arranged between the wheel-cylinder fluid pressure passage 27 conducting the ABS brake fluid pressure from the ABS system provided at the downstream side of the master cylinder 24 and the return fluid pressure passage 29 fluidically connected with the pump inlet port side of the ABS system. The cooperative brake control that can improve the energy recovery ratio regardless of the electric regeneration state can easily be executed based on the brake reaction force under the electric control.

Embodiment 7

The seventh embodiment is an example adapted to an on-vehicle electric motor having reduction gears and separated from a brake caliper, although it has fundamentally a construction similar to that of the sixth embodiment, while the in-wheel motor with the reduction gears is connected with the integral brake caliper in the sixth embodiment.

Figure 11:
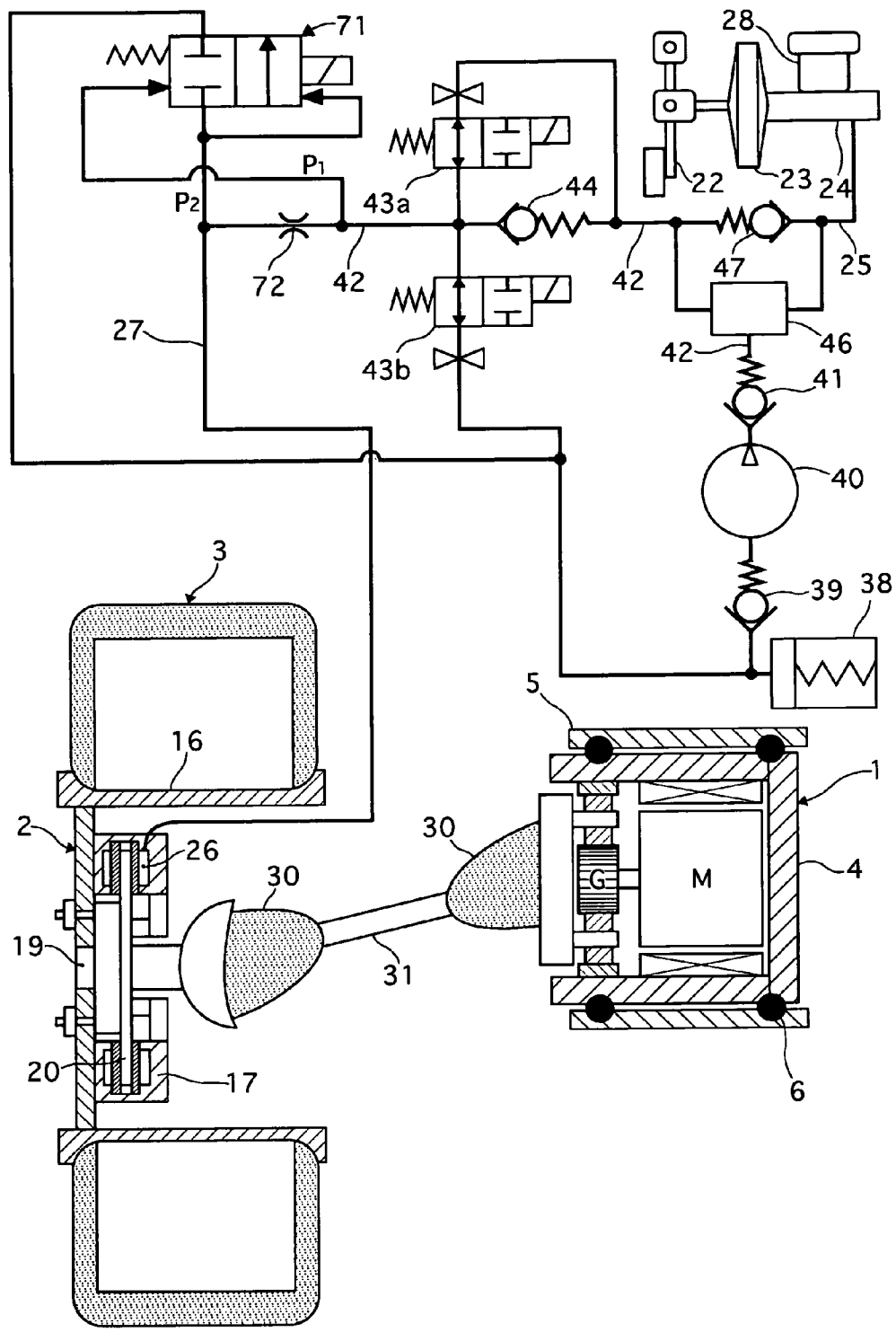
FIG. 11 is a diagram showing an entire system of a brake device for a motor vehicle of a seventh embodiment according to the present invention.

As shown in FIG. 11, a rotating electric machine 1 is an on-vehicle electric motor with reduction gears, in which the electric motor M and the reduction gears G are arranged in a machine-side cylindrical case 4 that is separated from a brake caliper 17 in a driving wheel. An electric feedback circuit has a pressure-reducing solenoid valve 71 arranged between a wheel-cylinder fluid pressure passage 27 conducting ABS brake fluid pressure from an ABS system provided at a downstream side of a master cylinder 24 to a wheel cylinder and a return fluid pressure passage 29 fluidically connected with a fluid pump inlet port side of the ABS system, and controls the pressure-reducing solenoid valve according to a detected torque value outputted from the load cell 70. Incidentally, the other parts of the seventh embodiment are similar to those of the sixth embodiment, and their explanations are omitted.

Next, its advantages will be described.

The brake device of the fourth embodiment can obtain an additional advantage listed below in addition to the advantages (1) and (2) described in the first embodiment and the advantage (14) described in the sixth embodiment.

(16) The rotating electric machine 1 is the on-vehicle electric motor with the reduction gears, in which the electric motor M and the reduction gears G are arranged in the machine-side cylindrical case 4 that is separated from the brake caliper 17 in the driving wheel. The electric feedback circuit has the pressure-reducing solenoid valve 71 arranged between the wheel-cylinder fluid pressure passage 27 conducting ABS brake fluid pressure from the ABS system provided at the downstream side of the master cylinder 24 to the wheel cylinder and the return fluid pressure passage 29 fluidically connected with the fluid pump inlet port side of the ABS system, and controls the pressure-reducing solenoid valve according to the detected torque value outputted from the load cell 70. The cooperative brake control that can improve the energy recovery ratio regardless of the electric regeneration state can easily be executed based on the brake reaction force under the electric control.

Embodiment 8

The eighth embodiment is an example in which a wheel is provided with a brake device, removing the rotating electric machine of the first embodiment.

Figure 12:
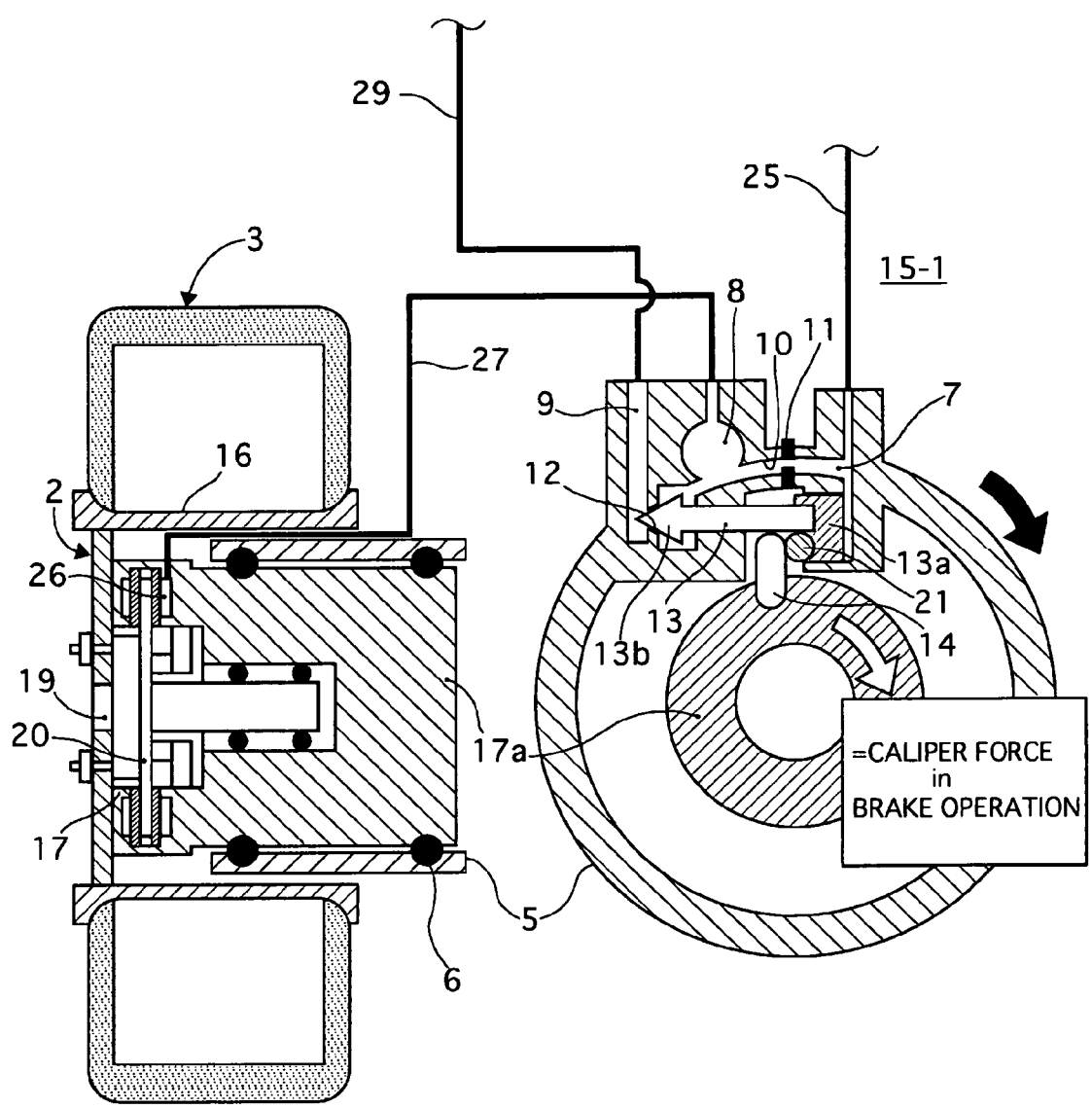
FIG. 12 is a diagram showing an entire system of a brake device for a motor vehicle of an eighth embodiment according to the present invention.

As shown in FIG. 12, a brake device of the eighth embodiment is equipped with a fluid pressure brake 2, of a disk brake type, that applies brake fluid pressure brake force to the wheel. The fluid pressure brake 2 acts as a braking means of the present invention. A caliper member 17a integrally formed with a brake caliper 17 of the fluid pressure brake 2 is used as a brake reaction force detecting means. Integrally, the other parts of the eighth embodiment are similar to those of the first embodiment, and the corresponding parts are indicated by the same reference numbers and their explanations are omitted.

Next, its operation will be described.

The brake force Fbra is obtained by the following equation.

$Fbra = \mu(P1 - \mu P2)$ $Fbra = \mu P1 - \mu \alpha Fbra$ (1), where $\mu$ is a friction efficient between the brake disk and its brake pad. Deforming the equation (1), the following equation is obtained.

$Fbra = [\mu/(1+\mu\alpha)] \times P1$ (2)

This equation (2) shows that as a coefficient $\alpha$ becomes larger, a change amount of the brake force relative to the variation in a friction coefficient between the brake disk and its brake pad. That is, brake force applied to the wheel by the fluid pressure brake 2 can be constantly applied regardless of the variation in the friction efficient between the brake disk and the brake pad due to running in the rain, abrasion of the brake pad or others. Incidentally, the master cylinder needs to output larger brake force when the coefficient $\alpha$ is set to be larger, and, instead of changing master cylinders, the brake force can be arbitrarily adjusted by changing an input/output ratio of a brake power booster.

Next, its advantages will be described.

The brake device of the eighth embodiment can obtain an additional advantage listed below in addition to the advantages (1) to (4) described in the first embodiment.

(17) The wheel is equipped with only the fluid pressure brake 2 that applies the brake force to the wheel. The brake reaction force detecting means is the caliper member 17a integrally formed with the brake caliper 17 of the fluid pressure brake 2. Therefore, the variation in the brake force applied to the wheel can be suppressed based on a simple detection of the brake reaction force by using the caliper member 17a regardless of the variation in the friction coefficient between the brake disk and the brake pad.

The brake devices of the present invention are described based on the first to eighth embodiments, and its specific construction in not limited to these embodiments, its design change and addition are included in this invention as long as they are not excluded from the spirits of the invention.

In the first to fifth embodiments, the orifice is provided with a fixed opening area in the communicating fluid pressure passage between the on-demand brake fluid pressure chamber and the wheel-cylinder fluid pressure chamber. Instead of this, for example, an orifice with a variable opening area may replace the one with the fixed opening area, so that its opening area is enlarged to ensure a high response to initial braking when a pressure difference between the on-demand brake fluid pressure and the wheel cylinder fluid pressure becomes large, and is lessened when the pressure difference becomes small, or a fluid pressure passage directing the on-demand brake fluid pressure and the wheel cylinder fluid pressure with each other and a communicating pressure passage with a fixed orifice may be arranged in parallel with each other, a mechanically controlled opening and closing valve being used in the fluid pressure passage so that the high response to the initial braking and a good wheel-cylinder fluid pressure modulation performance can consist with each other.

Instead of mechanically detecting the reaction force like the first embodiment in the eighth embodiment, the brake torque reaction force applied to the brake caliper 17 may be detected by using a piezoelectric element to decrease by a amount of the reaction force by using the pressure-reducing solenoid valve like the sixth and seventh embodiments. In addition, the fluid pressure brake may employ a drum brake type one, not limited the disk type one.

INDUSTRIAL APPLICABILITY

The brake device of the present invention can be adapted not only for a motor vehicle, such as an electric vehicle, a fuel cell vehicle, a hybrid electric vehicle or the like, that can obtain an on-demand brake force determined by the sum of the fluid pressure brake force and the regenerative brake force, but also for an engine vehicle with only a fluid pressure brake for a wheel.

The invention claimed is:

1. A brake device for a motor vehicle comprising:
a fluid pressure brake that applies fluid pressure brake torque to a wheel;
a wheel-cylinder pressure passage that is fluidically connected with the fluid pressure brake to provide the fluid pressure brake with wheel-cylinder pressure to generate the fluid pressure brake torque;
an on-demand brake pressure passage that is fluidically connectable with the wheel-cylinder pressure passage to determine on-demand brake torque;
a brake reaction torque detector configured to detect a brake reaction torque inputted to the fluid pressure brake;
a wheel-cylinder pressure modulator valve that is fluidically connected with the wheel-cylinder pressure passage and the on-demand brake pressure passage, the wheel-cylinder pressure modulator valve being capable of modulating the wheel-cylinder pressure so that the fluid pressure brake torque can be decreased based on the brake reaction torque and the on-demand brake torque,
wherein the brake reaction torque detector includes a machine-side cylindrical case with a working arm that is provided swingable relative to a vehicle body member so that the brake reaction torque of the fluid pressure brake can be changed into a displacement in a swing movement of the working arm so as to apply the brake reaction torque to a valve of the wheel-cylinder pressure modulator valve,
wherein the vehicle body member is formed with an on-demand brake fluid pressure chamber fluidically connected with the on-demand brake pressure passage, a wheel-cylinder fluid pressure chamber fluidically connected with the wheel-cylinder fluid passage and a return fluid pressure chamber fluidically connected with a return passage,
wherein an orifice is provided in a first communicating fluid pressure passage between the on-demand brake fluid pressure chamber and the wheel-cylinder fluid pressure chamber,
wherein the wheel-cylinder pressure modulator valve is provided in a second communicating fluid pressure passage between the wheel-cylinder fluid pressure chamber and the return fluid pressure chamber, and
wherein the wheel-cylinder pressure modulator valve has a mechanical feedback mechanism for modulating the wheel cylinder fluid pressure so that a sum torque of the brake reaction torque applied through the working arm in an opening direction and the fluid pressure brake torque due to the wheel cylinder fluid pressure in the opening direction can be balanced with the on-demand brake torque due to an on-demand brake fluid pressure generated in the on-demand brake pressure passage.

2. The brake device according to claim 1, further comprising an electric motor that is capable of applying regenerative brake torque to the wheel,
wherein the brake reaction torque detected by the brake reaction torque detector is generated due to the regenerative brake torque.

3. The brake device according to claim 2, wherein the wheel-cylinder pressure modulator valve decreases the wheel-cylinder pressure so that a sum torque of the regenerative brake torque and the fluid pressure brake torque can be balanced with the on-demand brake torque.

4. The brake device according to claim 1, further comprising a drive device that is contained in the machine-side cylindrical case to apply driving force to the wheel.

5. The brake device according to claim 4, wherein the drive device is an electric motor.

6. The brake device according to claim 3, wherein the electric motor is an in-wheel electric motor with reduction gears,
wherein the in-wheel electric motor and the reduction gears are arranged in the machine-side cylindrical case fixed to an integral brake caliper in a driving wheel,
wherein the wheel-cylinder pressure modulator valve has a piston and a valve member connected with the piston, one end portion of the piston being arranged in the on-demand brake fluid pressure chamber to receive the on-demand brake fluid pressure in a closing direction of the wheel-cylinder pressure modulator valve when the on-demand brake fluid pressure is generated and the valve member opening and closing a valve hole formed in a partition wall between the wheel-cylinder fluid pressure chamber and the return fluid pressure chamber, and
wherein the mechanical feedback mechanism is a first feedback mechanism for modulating the wheel cylinder pressure so that a sum torque of the wheel-cylinder brake torque and the regenerative brake torque applied to the piston through the working arm in the opening direction can be balanced with the on-demand brake torque acting in the closing direction and determined by a product of an on-demand fluid pressure and an effective pressure receiving area of the piston.

7. The brake device according to claim 3, wherein the working arm includes a first working arm and a second working arm that is apart from the first working arm,
wherein the electric motor is an on-vehicle electric motor with reduction gears, the electric motor and the reduction gears being arranged in the machine-side cylindrical case which is separated from a brake caliper in a driving wheel,
wherein the wheel-cylinder pressure modulator valve has a first piston and a valve member connected with the first piston, one end portion of the piston being arranged in the on-demand brake fluid pressure chamber to receive the on-demand brake fluid pressure in a closing direction of the wheel-cylinder pressure modulator valve when the on-demand brake fluid pressure is generated, and the valve member opening and closing a valve hole formed in a partition wall between a first wheel-cylinder fluid pressure chamber and the return fluid pressure chamber,
wherein the vehicle body side member is formed with a second wheel-cylinder fluid pressure chamber that is apart from the wheel-cylinder pressure modulator valve and provided with a second piston,
wherein the second working arm receives the regenerative brake torque from a piston rod of the second piston in the opening direction when the wheel-cylinder pressure is generated, and
wherein the mechanical feedback mechanism is a second feedback mechanism for modulating the wheel-cylinder pressure so that a sum torque of the wheel-cylinder brake torque and the regenerative brake torque applied to the first piston through the first working arm in the opening direction can be balanced with the on-demand brake torque acting in the closing direction and determined by a product of the on-demand brake fluid pressure and an effective pressure receiving area of the first piston.

8. The brake device according to claim 3, wherein the electric motor is an on-vehicle electric motor with reduction gears, the electric motor and the reduction gears being arranged in the machine-side cylindrical case which is separated from a brake caliper in a driving wheel, wherein the wheel-cylinder pressure modulator valve has a first piston, a second piston and a valve member connected with the first piston and the second piston, one end portion of the first piston being arranged in the on-demand brake fluid pressure chamber to receive the on-demand brake fluid pressure in a closing direction when the on-demand brake fluid pressure is generated, one end portion of the second piston being arranged in the wheel-cylinder fluid pressure chamber to receive the wheel-cylinder pressure in the opening direction when the wheel-cylinder pressure is generated, and the valve member opening and closing a valve hole formed in a partition wall between the wheel-cylinder fluid pressure chamber and the return fluid pressure chamber, and wherein the mechanical feedback mechanism is a third feedback mechanism for modulating the wheel-cylinder pressure so that the sum torque of the regenerative brake torque applied to the first piston through a first working arm in the opening direction and the fluid pressure brake torque due to the wheel-cylinder pressure in the opening direction and determined by a product of the wheel-cylinder pressure and an effective pressure receiving area of the second piston can be balanced with the on-demand brake torque acting in the closing direction and determined by a product of the on-demand brake fluid pressure and an effective pressure receiving area of the first piston.

9. The brake device according to claim 1, wherein the on-demand brake fluid pressure passage is a master-cylinder fluid pressure passage conducting master cylinder fluid pressure generated by a master cylinder according to a brake operation of a brake operating pedal.

10. The brake device according to claim 1, wherein the on-demand brake pressure passage is an ABS brake fluid pressure passage conducting ABS brake fluid pressure from an Antilock Brake System provided at a downstream side of a master cylinder.

11. The brake device according to claim 10, further comprising a brake controller configured to stop regenerative brake obtained by an electric motor in an Antilock Braking system operation.

12. The brake device according to claim 1, wherein the fluid pressure brake is provided for applying fluid pressure brake force to the wheel, and wherein the brake reaction torque detector is a caliper member integrally formed with a brake caliper of the fluid pressure brake.

13. The brake device according to claim 1, wherein the brake reaction torque detector is integrated with the wheel-cylinder pressure modulator valve.

14. The brake device according to claim 2, wherein the brake reaction torque detector is integrated with the wheel-cylinder pressure modulator valve.

15. The brake device according to claim 4, wherein the brake reaction torque detector is integrated with the wheel-cylinder pressure modulator valve.

\* \* \* \* \*